United States Patent [19]
Takagi

[11] Patent Number: 4,862,389
[45] Date of Patent: Aug. 29, 1989

[54] INFORMATION PROCESSOR WITH MULTI-WINDOW DISPLAY FUNCTION

[75] Inventor: Shiro Takagi, Yokohama, Japan

[73] Assignee: Kabushiki Kaisha Toshiba, Kawasaki, Japan

[21] Appl. No.: 100,884

[22] Filed: Sep. 25, 1987

[30] Foreign Application Priority Data

Dec. 26, 1986 [JP] Japan .............................. 61-315331

[51] Int. Cl.$^4$ ...................... G06F 15/626; H01R 1/06
[52] U.S. Cl. ..................................... 364/521; 340/721
[58] Field of Search ............... 364/521, 300, 518, 522; 340/721, 711, 747, 750

[56] References Cited

U.S. PATENT DOCUMENTS

| | | | |
|---|---|---|---|
| 4,555,775 | 11/1985 | Pike | 340/747 X |
| 4,653,020 | 3/1987 | Cheselka et al. | 340/721 X |
| 4,694,288 | 9/1987 | Harada | 340/747 X |
| 4,725,830 | 2/1988 | Kawai et al. | 340/711 X |

Primary Examiner—A. D. Pellinen
Assistant Examiner—A. Jonathan Wysocki
Attorney, Agent, or Firm—Finnegan, Henderson, Farabow, Garrett & Dunner

[57] ABSTRACT

When a function change key on a keyboard is operated, a key check section detects its operation and sends a function change key code to a function-key-use right changing unit. In response to this code, the unit calculates the window number of a window different from the window currently having the function-key-use right, and notifies a function key notifier that the calculated window is a new window having the function-key-use right. The same unit directs a CRT controller to display a marking frame around the function area of the new window. Upon depression of a function key, the key check section inputs a function key code to the function key identifier. The function key identifier notifies the task operating in the window having the function-key-use right of the input function code.

31 Claims, 6 Drawing Sheets

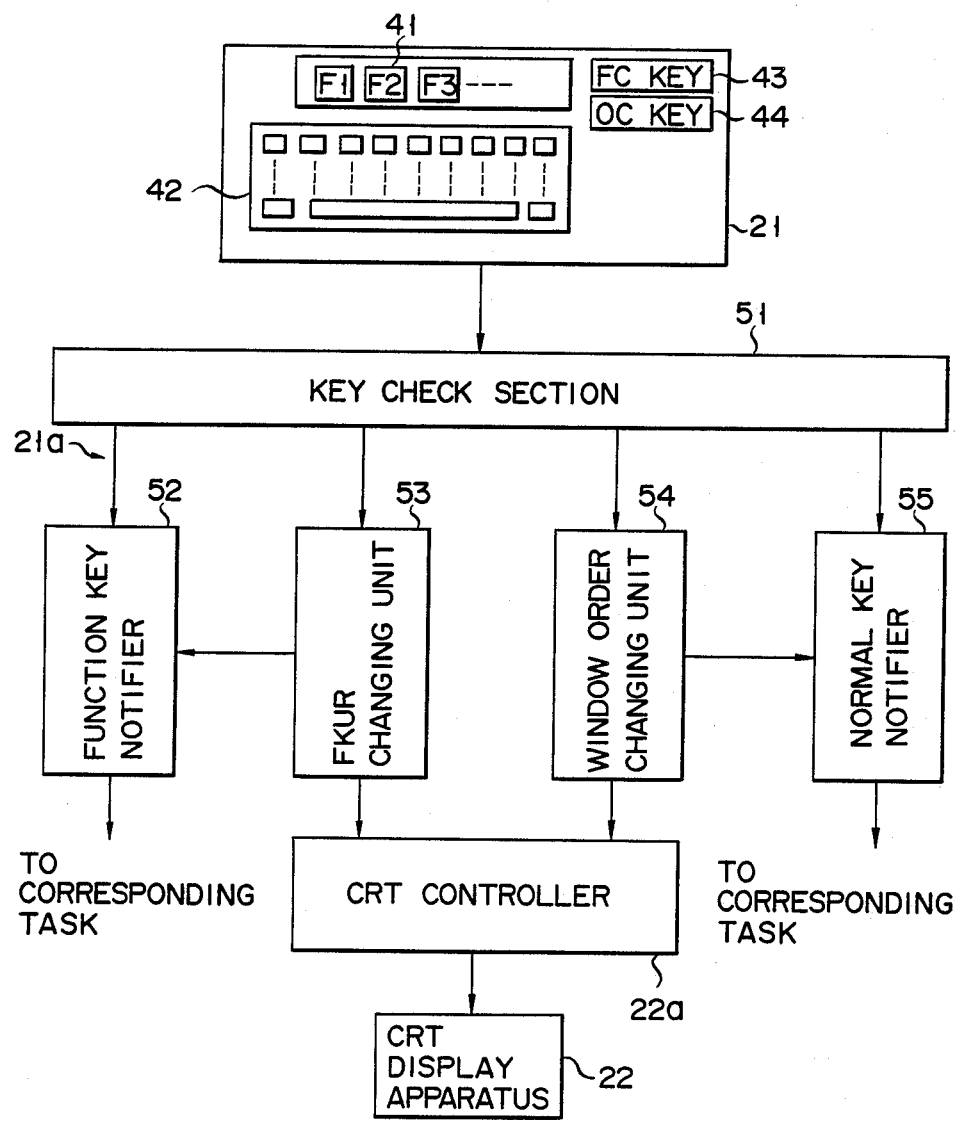
F I G. 2

INFORMATION PROCESSOR WITH MULTI-WINDOW DISPLAY FUNCTION

BACKGROUND OF THE INVENTION

This invention relates to an information processor having a multi-window display function and capable of executing various types of controls by function keys and the like.

As is well known, various types of information processors based on multi-task and multi-window display systems have been developed. The multi-window system is discussed in "News Preliminary Technical Overview", Oct. 1986, by Sun Microsystems Inc., and by Gettys J., "Problems Implementing Window Systems in UNIX", 1986 Winter USENIX Technical Conference Proceedings, Jan. 1986.

When the multi-window display is performed using this type of information processor, a plurality of windows are often displayed, overlapping each other. Also in this case, the right to use the keyboard is given to the uppermost (top) window of those overlapping windows on the CRT screen. Information entered from the keyboard is input to the top window. To enter information into windows other than the top window, the overlapping order (hereinafter referred to simply as the "order") of the windows must be changed so that the window to be keyed-in the information is located at the top in the CRT screen. In other words, some operation to give the right of the keyboard-use to the desired window is needed before information is keyed in.

An information processor with a multi-task function is frequently operated in a multi-mode, in which windows are assigned to various tasks, respectively. In such operation, a plurality of windows displayed frequently overlap each other, because of the limited size of the CRT screen.

To enter information into each window, the processing information of the task associated with the window is keyed in by function keys on the keyboard. Accordingly, the window displays the processing information assigned to the function keys.

In some situations, an operator may desire to enter processing information by the function keys to a window which is not the top window, and without changing its order. For example, in an information processor of the type in which information is retrieved from an optical disk apparatus, and the retrieved information is to be displayed, the information that the operator desires is retrieved from the optical disk apparatus by accessing functions in the first window, and the retrieved information is then displayed in the second window, which may be displayed above (on) or below (under) the first window. In order that the second window successively displays the plural pieces of information which are retrieved by accessing functions in the first window, the first or second function key, for example, must be used for entering the information to the first window. "The first function key in the first window" functions to display the information succeeding the information being currently displayed in the second window. "The second function key" functions to display the information preceding the currently displayed information.

In the conventional information processor, only the top window has the right to use keyboard keys including the function keys, and the right to use only the function keys cannot be applied to other windows. To give the right of the function keys use to another window, the order of that window must be set to the top. To change the window order, many CRT screens must be updated, and this updating takes much time. Thus, in order to display the next information, every time the first function key is to be input to the first window, the first window must become the top window. To see the information image in the second window, the operator must again execute the operation to change the second window to the top window. This is time consuming and troublesome work.

SUMMARY OF THE INVENTION

Accordingly, with the view of overcoming the problem due to the fact that it is impossible to change only the directions to the processing information corresponding to the plurality of windows, this invention has an object to provide an information processor in which the directable processing information is changeable without changing the window order of the window, and hence various processings can be performed in a simple and quick manner.

According to one aspect of this invention, there is provided an information processing apparatus comprising: means for displaying a plurality of windows in a partially overlapping fashion, each of the windows displaying the processing information provided for each window, the processing information containing a plurality of processing commands, means for selecting the processing information displayed corresponding to one window, of those processing information displayed for each window, means for intensitively displaying the processing information corresponding to the selected window, means for designating one processing command of the intensitively displayed processing information, and means for processing according to the processing command as designated by the designating means.

According to another aspect of this invention, there is provided an information processing apparatus comprising means for displaying a plurality of windows, and processing information corresponding to one window of said windows, the processing information containing a plurality of processing commands, means for selecting the window in which the processing information is to be displayed, means for changing and displaying the processing information corresponding to the selected window on the display means, means for designating one processing command of the displayed processing information, and means for processing according to the processing command as designated by the designating means.

According to a further aspect of this invention, there is provided an information processing apparatus comprising means for keying in information, means for displaying a plurality of windows, each of the windows displaying the processing information provided for each window, one of the windows displaying an identifier to indicate that key-in by said key-in means is acceptable, the processing information containing a plurality of processing commands, means for selecting the processing information displayed corresponding to one window, of those processing information displayed for each window, the selecting means being contained in the key-in means, means for intensitively displaying the processing information corresponding to the selected window, means for designating one processing command of the intensitively displayed processing information, and means for processing according to the processing command as designated by the designating means.

BRIEF DESCRIPTION OF THE DRAWINGS

FIG. 2 shows a view illustrating a major portion of the information processor of FIG. 1;

DETAILED DESCRIPTION OF THE PREFERRED EMBODIMENTS

Figure 1:
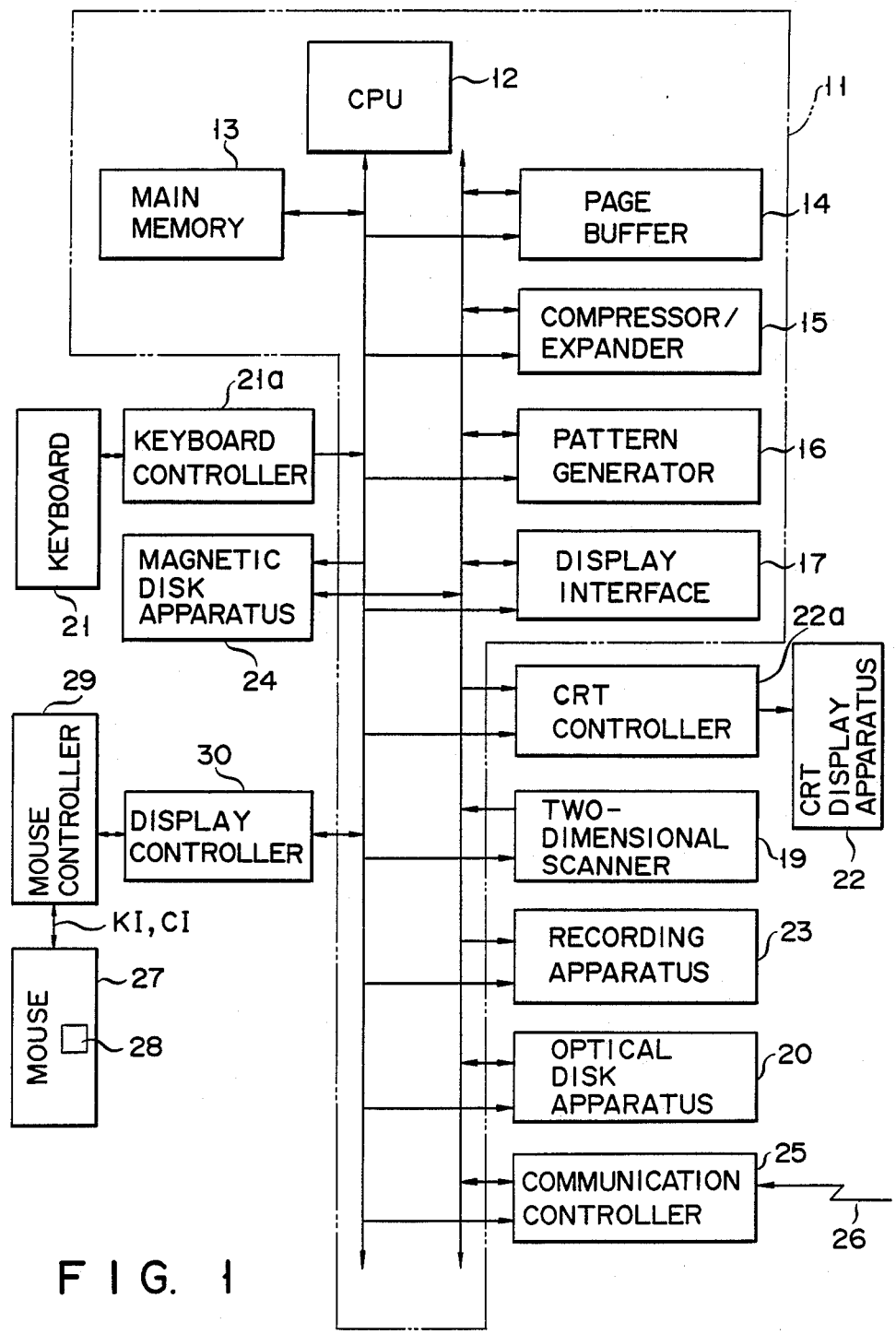
FIG. 1 shows a block diagram of a configuration of an information processor according to one embodiment of this invention.

FIG. 1 shows a configuration of an embodiment of information processor according to this invention.

Main controller 11 is made up of CPU12, main memory 13, page buffer 14, compressor/expandor 15, pattern generator 16, and display interface 17. CPU 12 can perform multi-task operations for various types of controls. Main memory 13 stores the control programs for CPU 12. Page buffer 14 has a memory capacity of 512 kb (=128 blocks), for example. Compressor/expandor 15 compresses the image information (reduces the redundancy of the information) and expands the same (restores the redundancy of the information). Pattern generator 16 stores the pattern information of characters, symbols, etc.

As a reader, two-dimensional scanner 19 two-dimensionally scans the document image (not shown) with a laser beam, for example, to obtain electrical signals corresponding to the document image. Optical disk apparatus 20 sequentially records the image information and the like, which are read out by scanner 19 and transferred through main controller 11, on an optical disk (not shown). Keyboard 21 keys-in the retrieval information relating to the image information, and commands for various types of operations. The output signal of keyboard 21 is supplied to CPU 21 via keyboard controller 21a. Cathode ray tube display apparatus (CRT display apparatus) 22 as a display is for displaying the image information which has been read out by the scanner 19 and supplied through main controller 11, or information which has been read out from the optical disk by optical disk apparatus 20 and supplied through the same route. CRT display apparatus 22 is controlled by CRT display controller 22a. The controller 22a has additional functions to control the display windows, and the display of the cursor moved by the mouse.

Recording apparatus 23, such as printer, prints out the image information, which has been read out by two-dimensional scanner 19 and supplied through main controller 11, or information which has been read out from the optical disk and supplied through the same route. Magnetic disk apparatus 24 stores, on a magnetic disk (not shown), a title table containing retrieval titles corresponding to the image information as the retrieval information, which has been entered by keyboard 21, for example. Communication controller 25, coupled with an external apparatus via communication line 26, transmits an image retrieval request signal and retrieval information, for example, and supplies the image retrieval request signal and the retrieval information, as sent to it, to main controller 11. Mouse 27, as an operating means, is for moving the cursor on the screen of CRT display apparatus 22. Mouse 27 is provided with a click button 28 as an input means. Mouse 27 is coupled with mouse controller 29, which produces cursor position signal KI on the CRT screen and operation signal CI representing operation states of click button 28. These signals output from mouse controller 29 are supplied to display controller 30 (and to main controller 11).

FIG. 2 shows a configuration of the major portion of the information processor according to this invention.

Keyboard 21 contains function keys 41, and normal keys 42 such as kana (Japanese phonetic symbols) keys and alphanumeric keys. The keyboard further contains function change (FC) key 43 for changing the window having the function-key-use right, and order change (OC) key 44 for changing a window order.

Keyboard controller 21a contains key check section 51. This section checks which of function keys 41, FC key 43, OC key 44, and normal keys 42, the key code input from keyboard 21 belongs to. When, as the result of the check, the key code corresponds to function keys 41, key check section 51 supplies the key code to function key notifier 52. When the key code corresponds to FC key 43, it is supplied to function-key-use right (FKUR) changing unit 53, from keyboard 21. When the key code corresponds to OC key 44, key check section 51 supplies the key code to window-order changing unit 54. Similarly, when the key code corresponds to normal key 42, it is transferred to normal key notifier 55.

Function key notifier 52 notifies the task operating in the window having the right to use function keys 41, of the input function key code. In this case, the notifier 52 has received the notification of this window from FKUR changing unit 53.

According to the supply of the key code from key check section 51, unit 53 deprives the window currently owning the right of function keys use of the right, and gives it to another window. Then, it informs function key notifier 52 and CRT controller 22a of the window now having the function-key-use right. In this case, unit 53 has stored the number of windows currently being displayed and the window number of the window currently having the function-key-use right under control of CPU 12. In response to the operation by FC key 43, FKUR changing unit 53 updates the number of the window currently having the function-key-use right. When the window number exceeds the number of windows, it is set to "1". If the number of windows is "2", the window number is updated "1", "2", "1", "2", ... in response to the operation of FC key 43. FKUR changing unit 53 notifies function key notifier 52 of this window number. According to this window number, it further notifies CRT controller 22a of the new owner of the function-key-use right.

According to the window number from the FKUR changing unit 53, CRT controller 22a intensifies the display of the window, as the present owner of the function-key-use right, of those windows on the CRT screen. Window-order changing unit 54 changes the order of the window according to the supply of the key code from key check section 51, viz., the operation of OC key 44. Further, it informs normal key notifier 55 and CRT controller 22a of the window having owned the right. CRT controller 22a causes CRT display apparatus 22 to update the images according to the signal from window-order changing unit 54. Normal key notifier 55 notifies the task operating in the window as the top window of the normal key code, in response to the signal supplied from window-order changing unit 54.

Figure 3A:
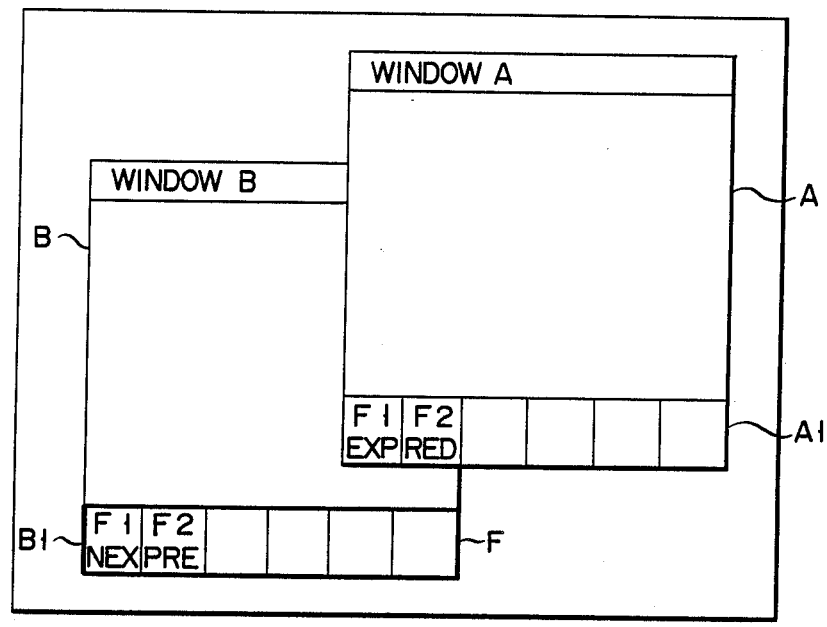
FIGS. 3A and 3B show views of examples of displays useful in explaining the operation of the FIG. 1 information processor.
Figure 3B:
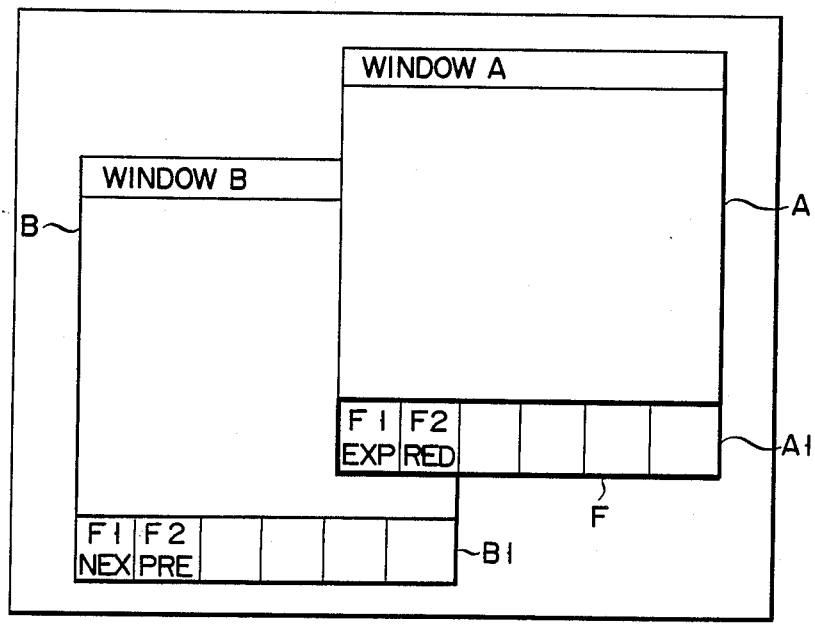

The operation of the information processor thus arranged will be described. FIGS. 3A and 3B show examples of the displays by CRT display apparatus 22. In this example, window A of window number "1" and window B of window number "2" are displayed partially overlapping each other. Function areas A1 and B1 are used in each of windows A and B. These function areas A1 and B1 have displays of command names of commands which will be executed when function keys 41 are operated. In FIGS. 3A and 3B, command name "EXP" means "expansion", "RED" means "reduction", "NEX" means "next", and "PRE" means "previous". In window A, for example, when first function key "F1" is operated, the image in the window A is expanded. When second function key "F2" is operated, the image in the window A is reduced. In window B, for example, when first function key "F1" is operated, window B displays the information following to the information being currently displayed in window A. When second function key "F2" is operated, window B displays the information preceding the currently displayed information in the window A.

The function area of the window having the function-key-use area is placed in the intensitive display, viz., surrounded by marking frame F, for example. From this marking frame F, the operator can see what kind of command is executed when he operates one of function keys 41. The intensitive display may be composed of an inverted display, the flickering display, and the like, in addition to the marking frame.

Figure 4:
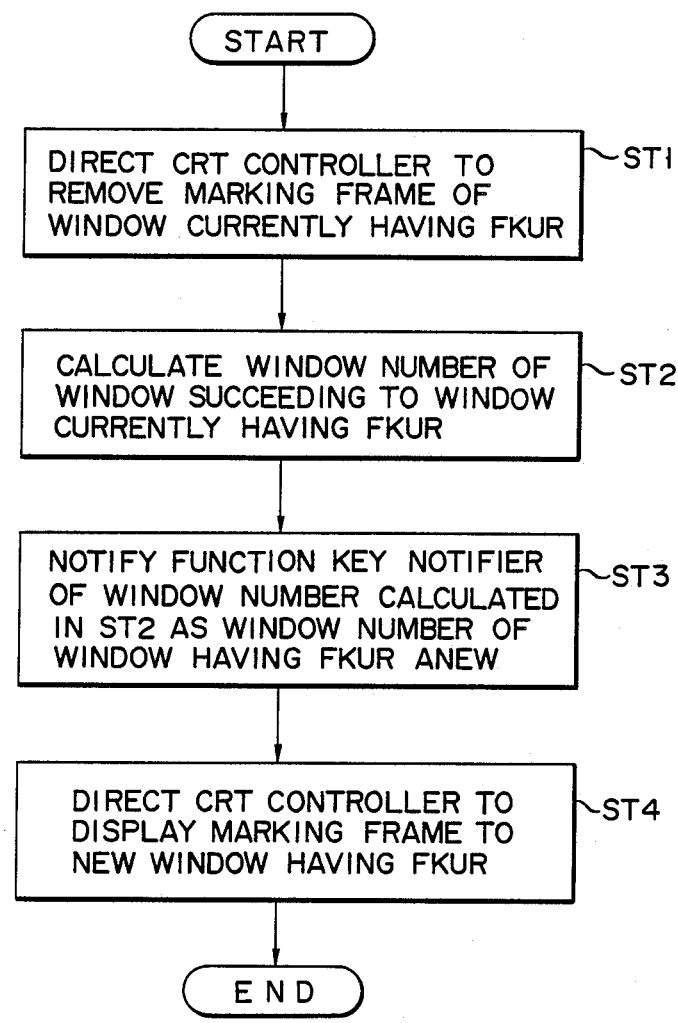
FIG. 4 shows a flow chart illustrating the operation of the FIG. 1 information processor.

FIG. 4 shows a flowchart illustrating the operation of FKUR changing unit 53. When FC key 43 is operated, function change key code is supplied to FKUR changing unit 53, from key check section 51. Upon receipt of this, FKUR changing unit 53, in step ST1, directs CRT controller 22a so as to remove the function area marking frame F in the window currently having the function-key-use right (window B in FIG. 3A). In step ST2, FKUR changing unit 53 calculates the window number ("1" in FIG. 3A) of a window different from the window currently having the function-key-use right (whose number is "2" in FIG. 3A). Then, in step ST3, it informs function key notifier 52 that the new window having the function-key-use right is window (A) of "1". In step ST4, it directs CRT controller 22a to apply marking frame F to the function area (A1) of the new window (A). In turn, the display as shown in FIG. 3B is obtained.

The display of FIG. 3A is for the case that the window B has the right to use function keys 41. Under this condition, if FC key 43 is operated, the function area A1 of window A is surrounded by marking frame F, as shown in FIG. 3B. The designation of the command for window A by function key 41 is acceptable.

The display thus configured is very useful for the information processor of the type in which information is retrieved from an optical disk and displays the retrieved information. For example, an operator retrieves some types of information necessary for the processing in the window B, from the optical disk, and successively displays the images of the retrieved information in window A. In this case, the operator must operate function key "F1" or "F2", for example, for the window B.

Here, function key "F1" functions to display the information following the information now being displayed in the window A. Function key "F2" functions to display the preceding information. To expand, for example, the image information displayed in window A, only two steps of key operation are required; FC key 43 is operated and function key "F1" is operated. It is noted that the function keys 41 are effective for entering the information in window A, without changing the order of the windows. Thus, the window order change is not required for switching the top window, i.e., having the function-key-use right, to another window. Therefore, there is no need for the image up-dating for window order change, thus expediting the information processing.

Figure 5A:
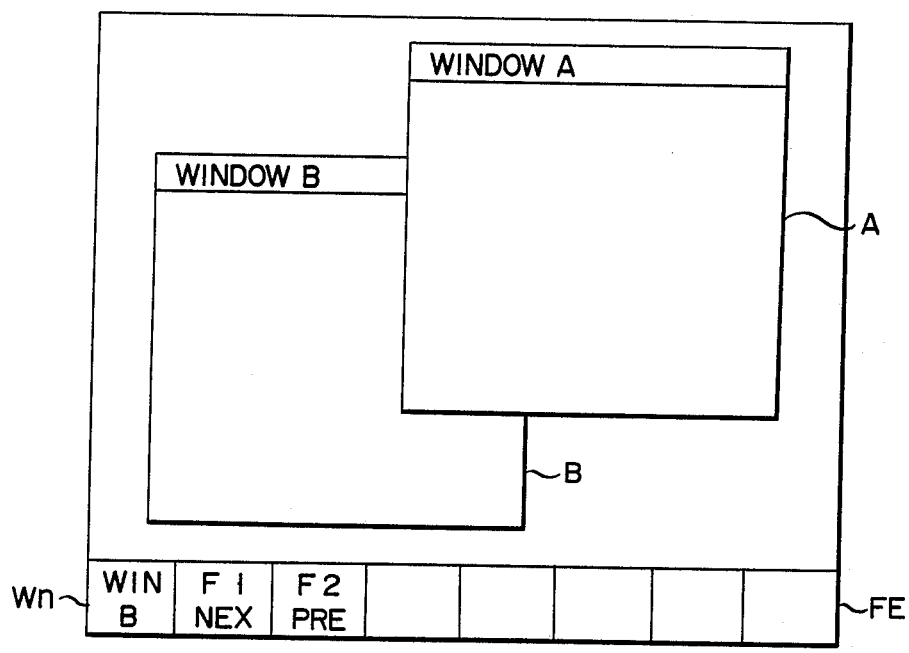
FIGS. 5A and 5B show views of examples of displays containing other display contents.
Figure 5B:
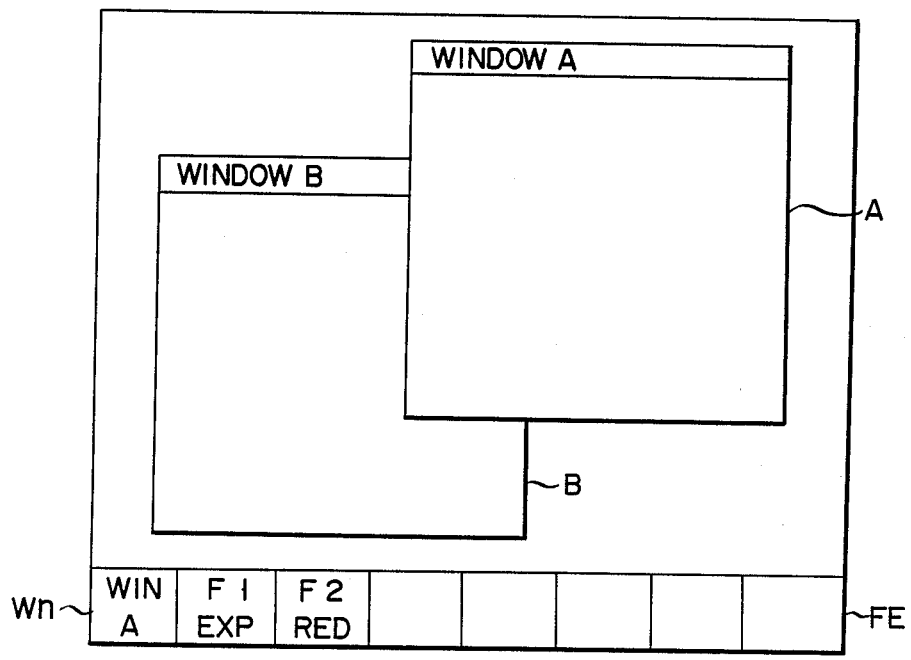

FIGS. 5A and 5B show examples of other displays on the screen of CRT display apparatus 22.

While windows A and B have function areas A1 and B1, respectively, in the FIGS. 3A and 3B case, a single function area FE is provided in the bottom part of the screen containing windows A and B. The window name Wn of the window having the right to use function keys 41 and the names of the commands of function keys 41, which are for the window, are displayed in the function key area FE. In this case, the FKUR changing unit 53 operates as follows:

(1) To calculate the window number ("1") of the window following to the window of window number ("2") (window B in FIG. 5A) currently having the right to use the function keys 41.

(2) To notify function key notifier 52 of the window (A) of "1" as the new window having the function-key-use right.

(3) To direct CRT controller 22a to display "WIN A" as the window name Na corresponding to the number "1" of the new window (A) and the command name as well in function area FE. As the result of such operations, the display as shown in FIG. 5B is obtained.

In the display state shown in FIG. 5A, the window B has the right to use function keys 41. Under this condition, if FC key 43 is operated, the display on the function area FE is changed as shown in FIG. 5B and the command for window A can be designated by function keys 41.

Figure 6A:
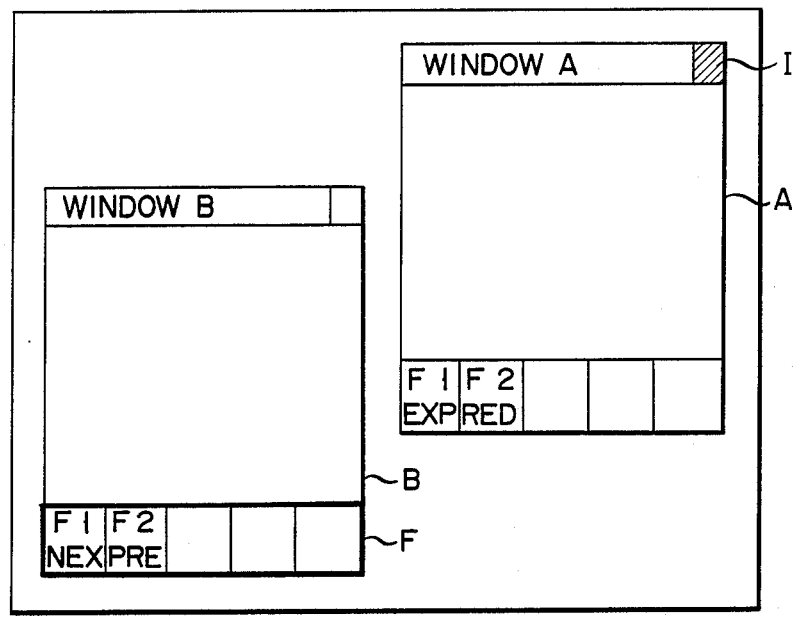
FIGS. 6A and 6B show views of examples of displays containing additional display contents.
Figure 6B:
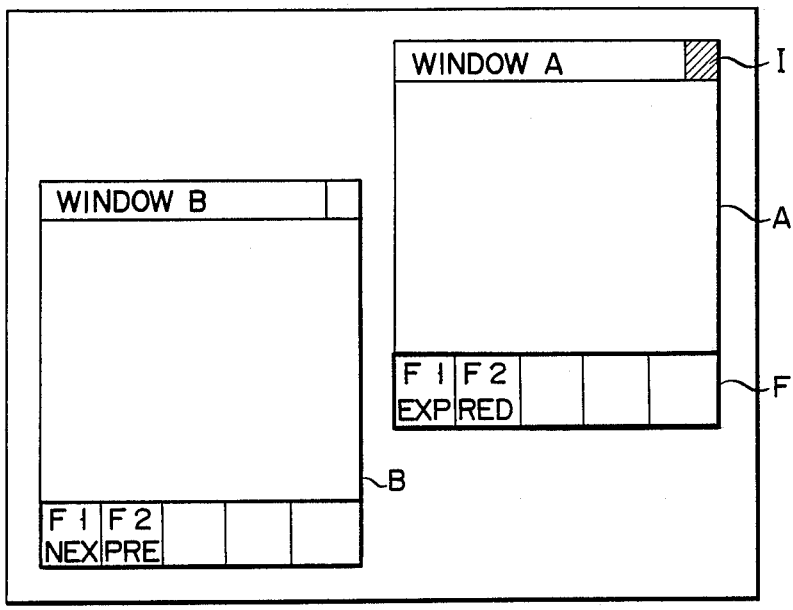

Further examples of displays on the screen of CRT display 22 are illustrated in FIGS. 6A and 6B.

In these examples, the function areas A1 and B1 are provided in windows A and B, as in the case of FIGS. 3A to 3B, but these windows are not overlapped. In these examples, since the windows are not overlapped, it is necessary to discriminate the top window from another window. To this end, identifier I is displayed in the window having function-key-use right in order to identify the window. The operation of the FKUR changing unit 53 is as indicated by the flowchart of FIG. 4.

In this instance, only the function-key-use right can be switched from one window to another window. Therefore, when the function-key-use right is switched, there is no need for changing the window order, and hence for updating the images. In this respect, the information processing speed is improved.

It should be noted that this invention is not limited to the above-mentioned specific embodiments, but may variously be changed within the scope of the invention.

As seen from the foregoing, only the processing information which can be designated, can be changed without changing the display states of the window. The information processor according to this invention is simple in operation and quick in processing.

What is claimed is:

1. An information processing apparatus comprising:
    display means for displaying a plurality of windows, ordered by a display priority, each of the windows having a processing area that displays information to be processed and a function area that displays a plurality of function commands;
    designating means, having a plurality of function keys, for designating one function command by operation of one of the function keys, each of the function commands displayed in the function area of the each window indicating a processing operation that corresponds to each function key of the designating means;
    selecting means for selecting the window that contains the function command corresponding to the function key of the designating means that is operated, without changing a display condition of the windows;
    distinguishing means for indicating on the display means the function area of the window selected by the selecting means; and
    processing means for performing, when one of the function keys is operated, a processing operation according to the function command that is distinctly displayed on the display means and that corresponds to the function key operated.

2. The information processing apparatus according to claim 1, wherein the display means displays the windows in a partially overlapping order representative of the display priority of the windows.

3. The information processing apparatus according to claim 1, wherein the distinguishing means displays a marking frame on the display means around the function area of the window selected by the selecting means.

4. The information processing apparatus according to claim 1, wherein the selecting means comprises a key switched in the designating means, and in response to the operation of the key switch, the distinguishing means indicates on the display means one of the function areas.

5. The information processing apparatus according to claim 1, further comprising:
    means for checking that the selecting means and the function keys are operated;
    means, when the selecting means is operated, for operating the distinguishing means; and
    means, when any one of the function keys is operated, for operating the processing means.

6. An information processing apparatus comprising:
    display means for displaying a plurality of windows, ordered by a display priority, the display means having a window display area that displays information to be processed, and a function area that displays a plurality of function commands each corresponding to one window;
    designating means, having a plurality of function keys, for designating one function command by operation of one of the function keys, each of the function commands displayed in the function area of the display means indicating a processing operation that corresponds to each function key of the designating means;
    selecting means for selecting the window that contains the function command corresponding to the function key of the designating means that is operated, without changing a display condition of the windows;
    changing/displaying means for changing and displaying the function commands in the function area corresponding to the window selected by the selecting means; and
    processing means for performing, when one of the function keys is operated, a processing operation according to the function command that is distinctly displayed on the display means and that corresponds to the function key operated.

7. The information processing apparatus according to claim 6, wherein the display means displays the windows in a partially overlapping order representative of the display priority of the windows.

8. The information processing apparatus according to claim 6, wherein the function area includes a region for displaying an indicative display representing the window selected by the selecting means.

9. The information processing apparatus according to claim 6, wherein the selecting means comprises a key switch in the designating means, and in response to the operation of the key switch, the changing/displaying means changes the function commands displayed in the function area to other function commands corresponding to the window, selected by the selecting means.

10. The information processing apparatus according to claim 6, wherein the function area includes a region for displaying an indicative display representing the window selected by said selecting means, and in response to the operation of said key switch, the changing/displaying means includes means for changing the indicative display representing the window selected by the selecting means.

11. The information processing apparatus according to claim 6, further comprising:
    means for checking that the selecting means and the function keys are operated;
    means, when the selecting means is operated, f operating the changing/displaying means; and
    means, when any one of the function keys is operated, for operating the processing means.

12. An information processing apparatus comprising:
    means for keying in information;
    display means for displaying a plurality of windows, each of the windows having a processing area that displays information to be processed and a function area that displays a plurality of function commands;
    designating means, having a plurality of function keys, for designating one function command by operation of one of the function keys, each of the function commands displayed in the function area of the each window indicating a processing operation that corresponds to each function key of the designating means, one of the windows displaying an identifier to indicate that, by operating the function keys of the designating means, a designation of the function command is acceptable;
    selecting means for selecting the window that contains the function command corresponding to the function key of the designating means that is operated, without changing a display condition of the windows;
    distinguishing means for indicating on the display means the function area of the window selected by the selecting means; and processing means for performing, when one of the function keys is operated, a processing operation according to the function command that is distinctly displayed by the display means and that corresponds to the function key operated.

13. The information processing apparatus according to claim 12, wherein the distinguishing means displays a marking frame on the display means around the function area of the window selected by the selecting means.

14. The information processing apparatus according to claim 12, wherein the selecting means comprises a key switch in the designating means, and in response to the operation of said key switch, the distinguishing means indicates on the display means one of the function areas.

15. The information processing apparatus according to claim 14, further comprising:
means for checking that the selecting means and the function keys are operated;
means, when the selecting means is operated, for operating the distinguishing display means; and
means, when any one of the function keys is operated, for operating the processing means.

16. An information processing apparatus comprising:
input means for performing a key-input, the input means having a plurality of function keys and a function change key;
window display means for displaying a plurality of windows, each of the windows having an area that displays information to be processed;
means for storing a window number representing the window that corresponds to the key-input function of the input means;
function command display means for displaying onto the window display means a plurality of function commands for the window that is represented by the window number stored in the storing means, each of the function commands indicating a processing operation that corresponds to each function key of that input means;
means for changing the window number stored in the storing means in response to the key-input by the function change key of the input means, without changing a display condition of the windows; and
processing means for performing, when the key-input by one of the function keys is performed, a processing according to the function command that is displayed on the window display means and that corresponds to the key-input by the function key.

17. The information processing apparatus according to claim 16, wherein the window display means includes displaying means for displaying the windows with a display priority that orders the windows, each of the windows having a processing area in which information to be processed is displayed and a function area in which a plurality of function commands is displayed, the function command display means includes distinguishing display means for distinctly displaying onto the window display means the function area of the window that is represented by the window number stored in the storing means, and the processing means includes processor means for performing the processing according to the function command that corresponds to the key-input by the function key.

18. The information processing apparatus according to claim 16, wherein the window display means includes means for displaying the windows in a partially overlapping order representative of the display priority of the windows.

19. The information processing apparatus according to claim 17, wherein the distinguishing display means includes means for displaying a marking frame around the function area of the window represented by the window number stored in the storing means.

20. The information processing apparatus according to claim 17, wherein the distinguishing display means includes means for distinctly and successively displaying one of the function areas onto the display means in response to the key-input by the function change key of the input means.

21. The information processing apparatus according to claim 16, further comprising:
means for checking that the key-input by the function keys and the function change key is performed;
means for operating, when the key-input by the function change key is performed, the window number changing means; and
means for operating, when the key-input by the function keys is performed, the processing means.

22. The information processing apparatus according to claim 16, wherein the window display means includes displaying means for displaying the windows with a display priority that orders the windows, the displaying means having a window display area for displaying the windows and a function area that displays the plurality of function commands, the function command display means includes function command displaying means for displaying, in the function area of the displaying means, the function commands for the window represented by the window number stored in the storing means, and the processing means includes processor means for performing the processing according to the function command that corresponds to the key-input by the function key of the function commands in the function area.

23. The function processing apparatus according to claim 22, wherein the window display means includes means for displaying the windows in a partially overlapping order representative of the display priority of the windows.

24. The information processing apparatus according to claim 22, wherein the function area includes a region for displaying an indicative display for indicating the window that is represented by the window number stored in the storing means.

25. The information processing apparatus according to claim 22, wherein the function command display means includes means for changing the function commands displayed in the function area, in response to the key-input by the function change key, to other function commands for the other window.

26. The information processing apparatus according to claim 25, wherein the function area includes a region for displaying an indicative display indicating the window represented by the window number stored in the storing means, and the displaying means includes means for changing the indicative display displayed in the function area to other indicative display indicating the other window in response to the key-input by the function change key.

27. The information processing apparatus according to claim 22, further comprising:
means for checking that the key-input by the function keys and the function change key is performed;

means, when the key-input by the function change key is performed, for operating the window number changing means, and means, when the key-input by the function keys is performed, for operating the processing means.

28. The information processing apparatus according to claim 16, wherein each of the windows displayed on the window display means has a processing area that displays information to be processed and a function area that displays a plurality of function commands, the window display means includes means for displaying an identifier to indicate that the key-input by the function key to the window represented by the window number stored in said storing means is acceptable, the function command display means includes distinguishing display means for distinctly displaying onto the displaying means the function area of the window, that is represented by the window number stored in the storing means, and the processing means includes processor means for performing the processing according to the function command in the function area distinctly displayed on the displaying means that corresponds to the key-input by the function key.

29. The information processing apparatus according to claim 28, wherein the distinguishing display means includes means for displaying a marking frame around the function area of the window represented by the window number.

30. The information processing apparatus according to claim 28, wherein the distinguishing display means includes means for distinctly and successively displaying one of the function areas onto the display means, in response to the key-input by the function change key of the input means.

31. The information processing apparatus according to claim 28, further comprising:

means for checking that the key-input by the function keys and the function change key is performed;

means, when the key-input by the function change key is performed, for operating the window number changing means; and means, when the key-input by the function keys is performed, for operating the processor means.

* * * * *